United States Patent [19]

Piera

[11] Patent Number: 5,800,869

[45] Date of Patent: Sep. 1, 1998

[54] METHOD OF MAKING AN OBJECT, IN PARTICULAR A CULINARY ARTICLE

[75] Inventor: Henri Piera, Moye, France

[73] Assignee: Seb S.A., Ecully, France

[21] Appl. No.: 829,816

[22] Filed: Mar. 25, 1997

Related U.S. Application Data

[63] Continuation of Ser. No. 428,480, Apr. 27, 1995, abandoned.

[30] Foreign Application Priority Data

Apr. 27, 1994 [FR] France .................. 94 05095

[51] Int. Cl.[6] .............. B05D 1/02; B05D 1/28; B05D 1/38
[52] U.S. Cl. .............. 427/256; 427/258; 427/260; 427/265; 427/287; 101/129; 101/492
[58] Field of Search .............. 427/265, 258, 427/260, 416, 419.4, 256, 287, 279, 486, 483, 261; 101/492, 129, 487

[56] References Cited

U.S. PATENT DOCUMENTS

| | | | |
|---|---|---|---|
| 838,155 | 12/1906 | Young | 427/260 |
| 2,617,740 | 10/1952 | Morris | 106/311 |
| 2,682,480 | 6/1954 | Andreas . | |
| 4,508,100 | 4/1985 | Deville | 126/390 |
| 5,076,469 | 12/1991 | Pleuse | 222/146.2 |
| 5,110,616 | 5/1992 | Lair et al. | 427/9 |

FOREIGN PATENT DOCUMENTS

| | | |
|---|---|---|
| 2156091 | 5/1973 | France . |
| 616827 | 4/1946 | United Kingdom . |
| 616827 | 1/1949 | United Kingdom . |
| 2138417 | 10/1984 | United Kingdom . |

*Primary Examiner*—Shrive Beck
*Assistant Examiner*—Fred J. Parker
*Attorney, Agent, or Firm*—Young & Thompson

[57] ABSTRACT

In a method of applying a decoration to an object, at least one layer of enamel frit slip is applied to the object, after which, without curing this layer, a decoration based on enamel frit and mineral pigments is applied to localized areas of this layer in the form of a paste containing the enamel frit, the pigments and a binder that can be melted by application of heat or cross-linked by exposure to ultraviolet light. The paste is heated when it is applied to the enamel frit slip layer to melt the binder that can be melted by heat, after which the combination is cured to vitrify the enamel frit slip layer and the decoration.

12 Claims, 2 Drawing Sheets

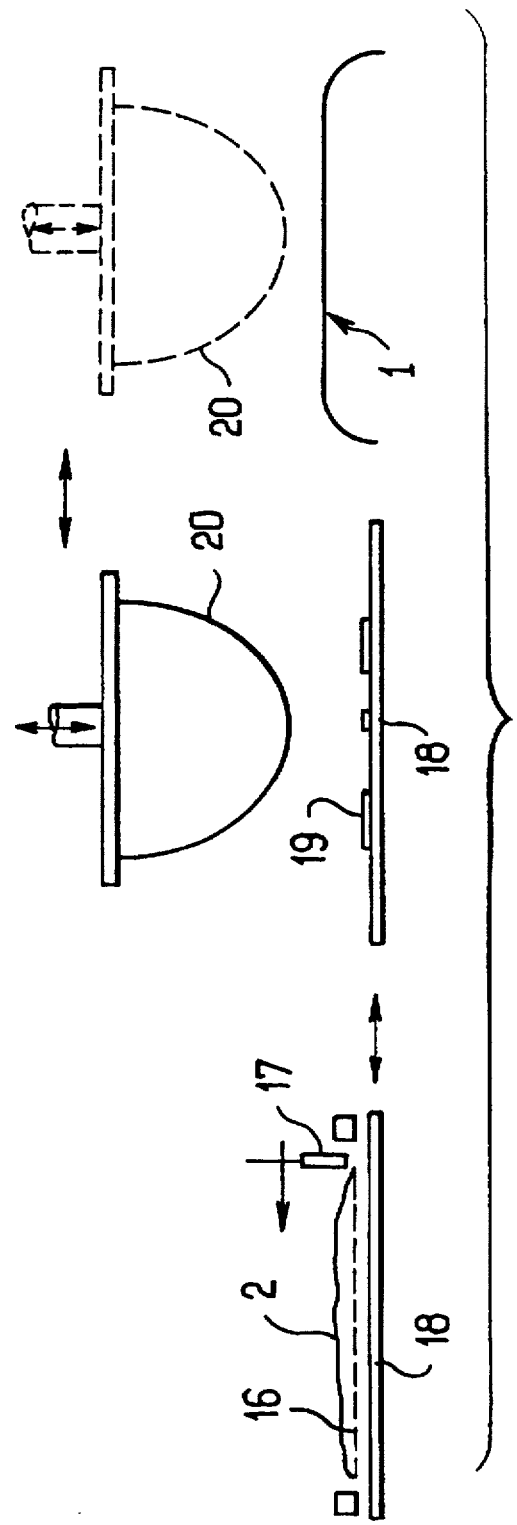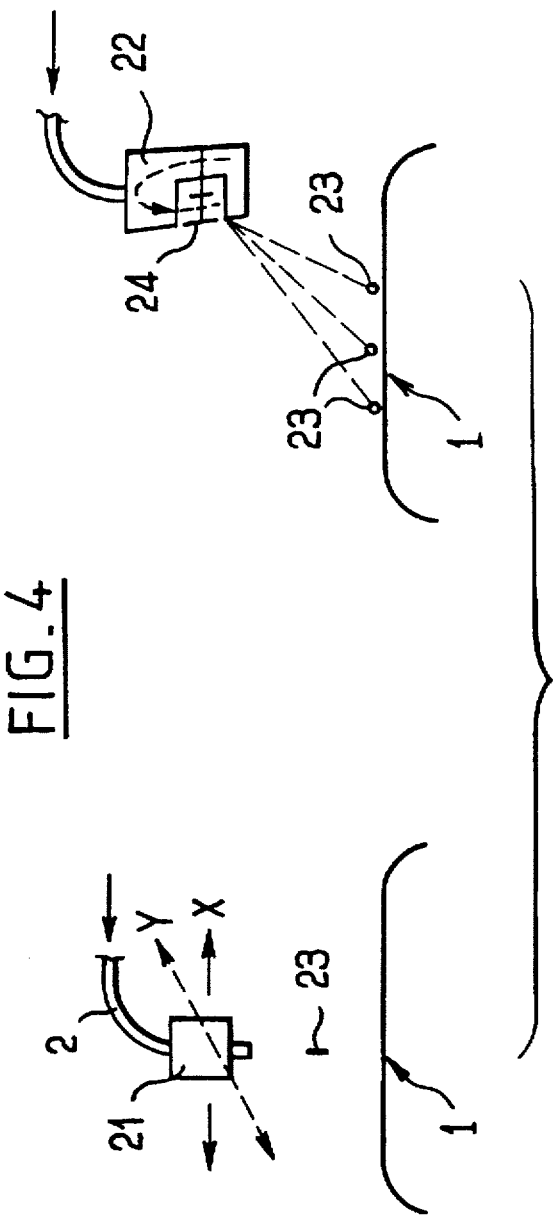
FIG. 4
FIG. 5

METHOD OF MAKING AN OBJECT, IN PARTICULAR A CULINARY ARTICLE

This application is a continuation of application Ser. No. 08/428,480, filed Apr. 27, 1995, now abandoned.

BACKGROUND OF THE INVENTION

1. Field of the Invention

The present invention concerns a method of applying decoration to an object, in particular a culinary article to which at least one layer of enamel frit slip is applied after which a decoration based on enamel frit and mineral pigments is applied to said layer without curing it.

2. Description of the Prior Art

A method of this kind is described in European patent No 127 489.

In this method the first layer of enamel frit slip sprayed onto the object is first dried, after which an oily paste containing enamel frit mixed with a pigment is applied to this layer through a silk screen.

The combination is then cured to vitrify simultaneously the enamel frit of the first layer and that contained in the decoration.

This method achieves excellent adhesion of the decoration to the base enamel layer, with the result that the decoration is highly resistant to the repetitive heating and cooling cycles to which culinary articles are subjected.

This method has drawbacks, however.

In particular, with the above method it is difficult to produce a multicolored decoration that can be cured at the same time as the base enamel frit layer, i.e. in a single operation.

An object of the invention is to overcome the above drawbacks.

SUMMARY OF THE INVENTION

The invention consists in a method of applying a decoration to an object, in particular a culinary article, wherein at least one layer of enamel frit slip is applied to the object, after which, without curing said layer, a decoration based on enamel frit and mineral pigments is applied to localized areas of said layer, in which method the enamel frit slip layer is dried and said decoration is obtained from a paste including the enamel frit, the pigments and a binder that can be melted by application of heat or cross-linked by exposure to ultraviolet radiation, this paste being heated when it is applied to said enamel frit slip layer to melt the binder which can be melted by heat, after which the combination is cured to vitrify said layer and said decoration.

The method of the invention can be used to apply an enamel decoration in one or more colors, for example to the bottom or to the side wall of a cooking utensil.

The use of a binder that can be melted by application of heat or cross-linked by exposure to UV light to produce the decoration allows direct application of the decoration to the previously dried enamel frit layer.

In a preferred embodiment of the invention the paste is applied through a silk screen applied to the enamel frit slip layer, this screen being heated to melt the binder that can be melted by application of heat.

In another embodiment of the invention the paste is applied by means of a rubber stamp, using an etched photographic plate reproducing the decoration to be obtained and to which the paste is applied and a rubber stamp which is applied first to the paste deposited on the plate to pick up the paste and then to the enamel frit slip layer deposited on the object.

In a third embodiment of the invention the paste is applied by an offset method using an inking roller rotating in an inking device containing said paste and depositing the paste taken up from the inking device on an etched photographic plate reproducing the decoration to be applied and carried by a second roller in contact with the first roller and rotated by the latter, this second roller carrying the plate being in contact with a third or applicator roller in contact with a circular object to be decorated so that the applicator roller as it rotates takes up the paste deposited on the plate and applies it to the circular object.

In a fourth embodiment of the invention the paste is applied by a total transfer method through a silk screen through which the paste is deposited onto a support, this screen being then removed from the support, after which the decoration in the form of the paste applied to the support is taken up by application of a rubber stamp and then transferred by the latter to the object to be decorated.

In a fifth embodiment of the invention the paste is applied by means of a nozzle spraying onto the object to be decorated droplets distributed over a plurality of locations of the object.

Other features and advantages of the invention will emerge from the following description.

BRIEF DESCRIPTION OF THE DRAWINGS

In the appended drawings, provided by way of non-limiting example:

FIG. 4 is a diagram illustrating a fourth version of the method of the invention.

FIG. 5 is a diagram illustrating a fifth version of the method of the invention.

DETAILED DESCRIPTION OF THE PREFERRED EMBODIMENTS

Figure 1:
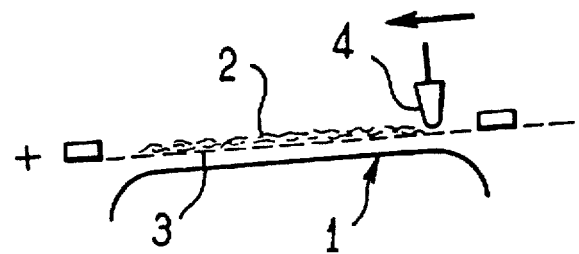
FIG. 1 is a diagram illustrating a first version of the method of the invention.

In the version shown in FIG. 1 the method of applying a decoration to an object, in particular a culinary article 1, consists in applying to the object at least one layer (not shown) of enamel frit slip after which a decoration based on enamel frit and mineral pigments is applied to localized areas of said layer without curing it. The slip can be applied by spraying it in the form of an aqueous suspension, for example.

In accordance with the invention, the decoration is made from a paste including the enamel frit, the pigments and a binder which can be melted by application of heat or cross-linked by exposure to ultraviolet light. This paste is heated when it is applied to the layer of enamel frit slip to melt the binder, after which the combination is cured to vitrify this layer and the decoration.

In the FIG. 1 example the paste 2 is applied by means of a squeegee 4 through a silk screen 3 applied to the layer of enamel frit slip. The screen 3 is heated to melt the binder which can be melted by application of heat.

The screen 3 is preferably made of metal and can therefore be heated by the Joule effect.

The binder in the paste 2 that can be melted by application of heat can be based on wax.

The composition of the paste 2 can be as follows, for example:

| enamel frit powder | 100 parts by weight, |
|---|---|
| mineral pigments | 25 parts by weight, |
| binder (e.g. stearic alcohol) | 60 parts by weight. |

Figure 2:
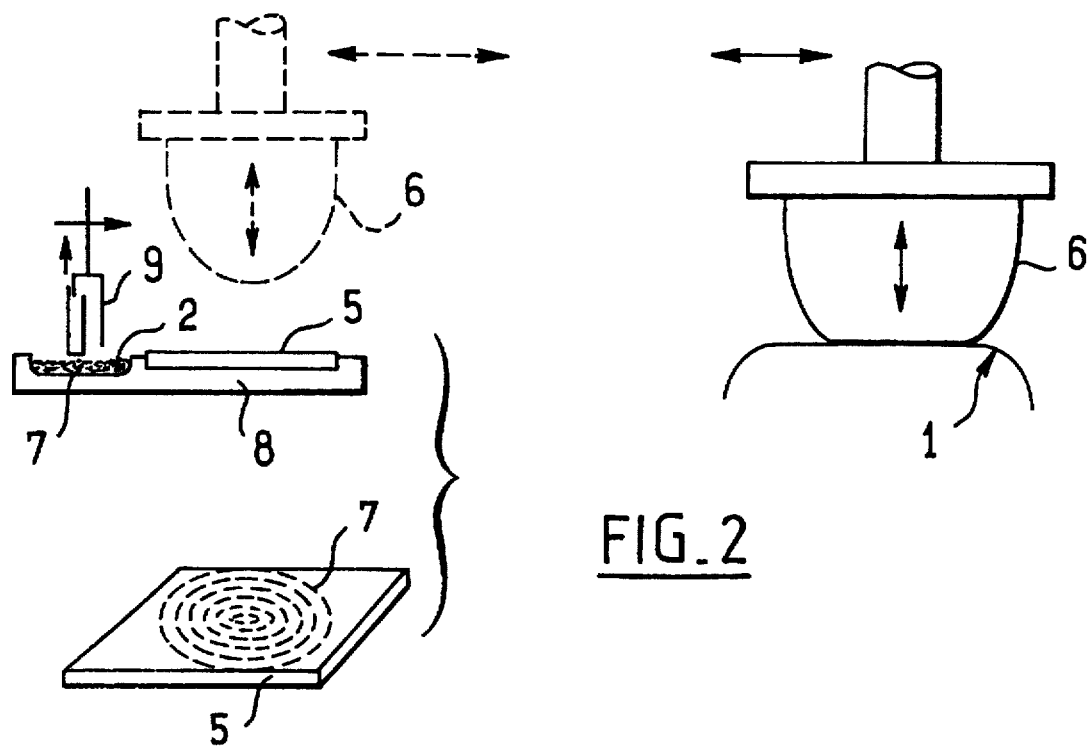
FIG. 2 is a diagram illustrating a second version of the method of the invention.

In the FIG. 2 version the paste 2 is applied by means of a rubber stamp using an etched photographic plate 5 reproducing the decoration 7 to be applied, to which the paste 2 is applied. A stamp 6 made of silicone rubber, for example, is applied first to the paste 2 deposited on the plate 5, to take up the paste, and then to the layer of enamel frit slip deposited on the object 1.

In the FIG. 2 example the paste 2 is contained in an inking device 7 formed in a support 8 carrying the plate 5. The paste 2 is applied to the plate 5 by means of a squeegee 9 moving between the inking device 7 and the plate 5. The inking device 7 and the plate support 8 are heated to melt the binder contained in the paste 2 that can be melted by application of heat.

Figure 3:
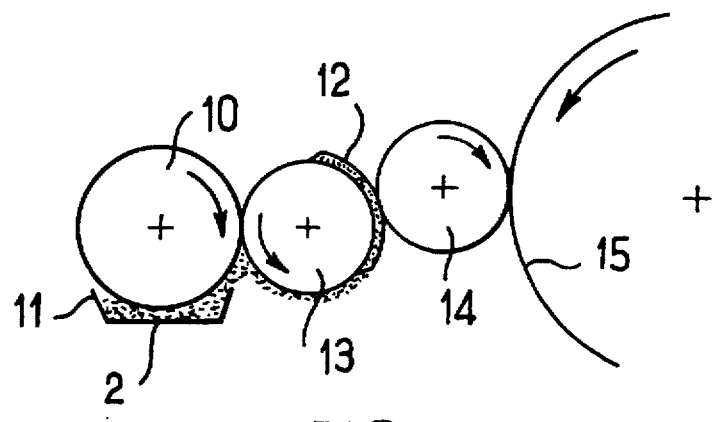
FIG. 3 is a diagram illustrating a third version of the method of the invention.

In the FIG. 3 version of the method the paste 2 is applied by an offset process using an inking roller 10 turning in an inking device 11 containing the paste 2 and depositing the paste taken up from the inking device 11 on an etched photographic plate 12 reproducing the decoration to be applied. The plate 12 is applied to a second roller 13 in contact with the first roller 11 and rotated by the latter. The second roller 13 carrying the plate 12 is in contact with a third or applicator roller 14 made of silicone rubber in contact with a circular object 15, for example a saucepan to be decorated, so that the applicator roller 14 can take up the paste deposited on the plate 12 as it rotates and apply it to the circular object 15.

In the FIG. 4 example the paste 2 is applied by a total transfer process using a silk screen 16 heated by the Joule effect through which the paste 2 is deposited on a support 18 by means of a squeegee 17. The screen 16 is then removed from the support 18, after which the decoration 19 in the form of paste applied to the support 18 is picked on a silicone rubber stamp 20 and transferred by the latter to the object 1 to be decorated.

In all the versions described above a decoration consisting of a plurality of colors can be applied to the object by repeating the operations of applying the decoration a number of times corresponding to the number of colors.

In the FIG. 5 version of the method the decoration is applied by means of a nozzle 21, 22 spraying onto the object 1 to be decorated droplets 23 distributed over a plurality of locations of the object.

The droplets 23 contain enamel frit and mineral pigments.

In the diagram on the left in FIG. 5, the nozzle 21 is moved along X and Y axes over the object 1 during the operation.

In the diagram on the right in FIG. 5 the nozzle 22 is fixed and the droplets 23 are deflected by means of an electrostatic field 24.

The nozzle 21 or 22 can be heated to liquefy the binder in the paste 2 fed into the nozzle that can be melted by application of heat.

In all versions of the method a binder that can be cross-linked by exposure to ultraviolet light can be used instead of the binder that can be melted by application of heat. In this case each application of the enamel frit paste is followed by exposure to light from an ultraviolet lamp.

Likewise, the final single curing vitrifies simultaneously the enamel particles of the base layer or layers and those in the decoration which can be polychromatic.

All versions of the method achieve excellent adhesion of the decoration to the base enamel layer.

There is claimed:

1. A method of applying a decoration to an object, comprising the steps of:

applying at least one layer to form a base layer of enamel frit slip to the object;

drying the base layer without curing the base layer;

applying the decoration to a portion of the base layer, the decoration including a paste having an enamel frit, mineral pigments, and one of a binder that is meltable by heat and a binder that can be cross-linked by ultraviolet radiation, wherein if the binder is meltable by heat, said decoration applying step includes heating the paste when the decoration is applied so as to melt the binder; and curing the object to vitrify the base layer and the decoration.

2. The method according to claim 1, wherein said decoration applying step includes applying a silk screen to the base layer, and applying the paste through the silk screen, wherein if the binder is meltable by heat, said decoration applying step includes heating the silk screen to melt the binder.

3. The method according to claim 2 wherein said screen is made of metal and is heated by the Joule effect.

4. The method according to claim 1, wherein said decoration applying step includes:

depositing the paste on an etched photographic plate having a reproduction of the decoration, applying a rubber stamp to the plate to pick up the paste, and then applying the rubber stamp to the base layer to deposit the paste on the base layer.

5. The method according to claim 4 wherein said paste is contained in an inking device in a support carrying said object and applied to the latter by means of a squeegee moving between said inking device and said object, said inking device and said support of said object being heated to melt said binder which can be melted by heat.

6. The method according to claim 1, wherein said decoration applying step includes:

rotating a first roller in a paste reservoir to pick up the paste, rotating the first roller against a second roller, which has on a surface thereof an etched photographic plate with a reproduction of the decoration, so that the paste is deposited on the etched photographic plate, rotating the second roller against a third roller, and rotating the third roller against the object to apply the paste to the object.

7. The method according to claim 1, wherein said decoration applying step includes:

depositing the paste onto a support through a silk screen, removing the silk screen from the support, applying a rubber stamp against the support to pick up the paste, and applying the rubber stamp against the object to transfer the paste to the object.

8. Method according to claim 1 wherein a decoration consisting of a plurality of colors is applied to said object by repeating application of the decoration a number of times corresponding to the number of colors, with each application applying one of the plurality of colors.

9. Method according to claim 1 wherein said paste is applied by means of a nozzle spraying onto said object to be decorated droplets distributed over several locations of said object.

10. Method according to claim 9 wherein during spraying said nozzle is moved across said object.

11. Method according to claim 9 wherein said nozzle is fixed and said droplets are deflected by means of an electrostatic field.

12. Method according to claim 9 wherein said nozzle is heated to liquefy said binder that can be melted by heat contained in said paste.

* * * * *